United States Patent
Nakatani et al.

(10) Patent No.: US 10,799,943 B2
(45) Date of Patent: Oct. 13, 2020

(54) METHOD OF PRODUCING EXOTHERMIC MOLD POWDER IN FORM OF SPRAYED GRANULES

(71) Applicant: SHINAGAWA REFRACTORIES CO., LTD., Tokyo (JP)

(72) Inventors: Erika Nakatani, Tokyo (JP); Yukimasa Iwamoto, Tokyo (JP)

(73) Assignee: SHINAGAWA REFRACTORIES CO., LTD., Tokyo (JP)

( * ) Notice: Subject to any disclaimer, the term of this patent is extended or adjusted under 35 U.S.C. 154(b) by 0 days.

(21) Appl. No.: 16/303,308

(22) PCT Filed: Mar. 19, 2018

(86) PCT No.: PCT/JP2018/010797
§ 371 (c)(1),
(2) Date: Nov. 20, 2018

(87) PCT Pub. No.: WO2018/180702
PCT Pub. Date: Oct. 4, 2018

(65) Prior Publication Data
US 2019/0210097 A1     Jul. 11, 2019

(30) Foreign Application Priority Data
Mar. 30, 2017   (JP) ................. 2017-067378

(51) Int. Cl.
*B22D 11/111*   (2006.01)
*C21C 7/076*   (2006.01)
*C09K 5/18*   (2006.01)
*B22D 11/108*   (2006.01)
*B22F 9/02*   (2006.01)

(52) U.S. Cl.
CPC .......... *B22D 11/111* (2013.01); *B22D 11/108* (2013.01); *B22F 9/026* (2013.01); *C09K 5/18* (2013.01); *C21C 7/076* (2013.01)

(58) Field of Classification Search
CPC ..... B22D 11/111; B22D 11/108; B22F 9/026; C21C 7/076; C09K 5/18
See application file for complete search history.

(56) References Cited

FOREIGN PATENT DOCUMENTS

| JP | 6-23502 | 2/1994 |
| JP | 6-63713 | 3/1994 |
| JP | 8-90179 | 4/1996 |
| JP | 11-320055 | 11/1999 |
| JP | 3215970 | 10/2001 |
| JP | 2008-55320 | 3/2008 |

(Continued)

OTHER PUBLICATIONS

JP 2013163193 machine translation of the description (Year: 2013).*

(Continued)

*Primary Examiner* — Tima M. McGuthry-Banks
(74) *Attorney, Agent, or Firm* — Wenderoth, Lind & Ponack, L.L.P.

(57) ABSTRACT

A method of producing an exothermic mold powder in a form of sprayed granules of the present invention includes spray-drying into granules, an aqueous slurry containing: a raw material blend; and a metal silicon powder and/or a silicon alloy powder, the method comprising adjusting the pH of the aqueous slurry to 13 or less.

8 Claims, 1 Drawing Sheet

(56) References Cited

FOREIGN PATENT DOCUMENTS

| JP | 2010-247255 | 11/2010 |
| JP | 2013-163193 | 8/2013 |
| JP | 5857777 | 2/2016 |

OTHER PUBLICATIONS

JP H0623502 machine translation of the description (Year: 1994).*
JP H0623502 A human translation (Year: 1994).*
JP 2013163193 A human translation (Year: 2013).*
International Search Report and Written Opinion of International Searching Authority dated Jun. 5, 2018 in International (PCT) Application No. PCT/JP2018/010797.
Office Action dated Apr. 5, 2019 in corresponding Canadian Patent Application No. 3,932,563.

* cited by examiner

[Fig. 1]
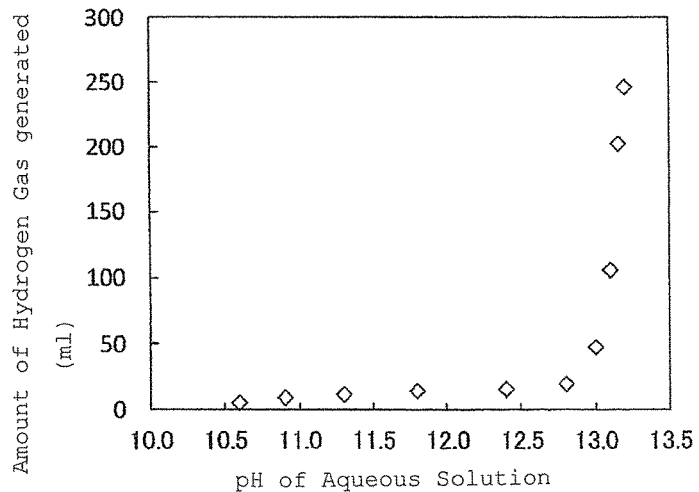
[Fig. 2]
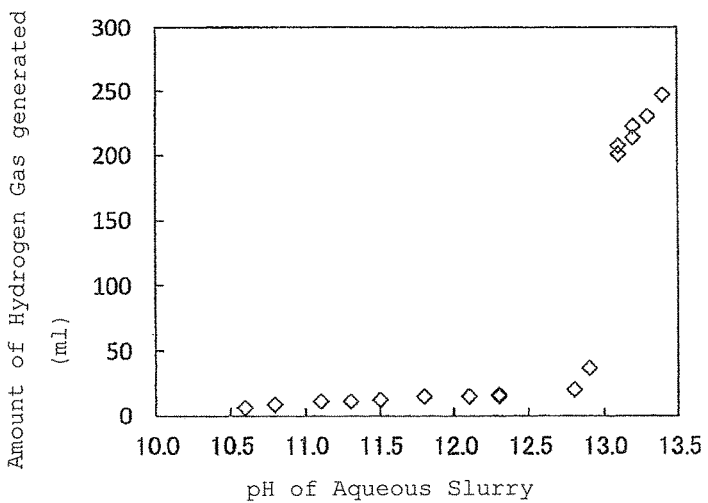
[Fig. 3]
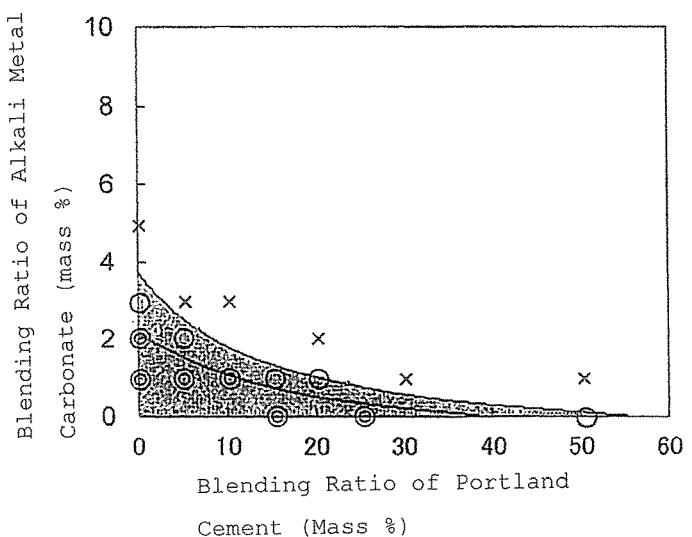

METHOD OF PRODUCING EXOTHERMIC MOLD POWDER IN FORM OF SPRAYED GRANULES

TECHNICAL FIELD

The present invention relates to a method of producing a granular mold powder to be added to a surface of molten steel in a water-cooled mold in continuous casting of molten steel, and more specifically, to a method of producing an exothermic mold powder in the form of sprayed granules for continuous steel casting in which a metal is added to a granular mold powder to impart an exothermic property.

BACKGROUND ART

In continuous casting of molten steel, a mold powder is added to a surface of molten steel in a water-cooled mold (hereinafter referred to as "mold"), melted, and consumed when flowing into an interface between the mold and a solidified shell. As major roles of the mold powder, the following five roles are given: (1) lubrication between the mold and the solidified shell; (2) control of the cooling speed of the solidified shell; (3) dissolution and absorption of inclusions floating from the molten steel; (4) heat retention of the molten steel; and (5) prevention of re-oxidation of the molten steel.

Of those, the heat retention action on the molten steel is one of the important roles of the mold powder. When a mold powder having poor heat retention properties is used, for example, deckel, which solidifies the surface of the molten steel, occurs, and operation stability is impaired. In addition, when mold powder having poor heat retention properties is used, a so-called finger nail-like solidified shell, in which a tip of the solidified shell extends along a meniscus, is formed even when deckel does not occur. Non-metal inclusions floating up from inside the molten steel, such as alumina, or bubbles are trapped thereon, and defects, such as slag inclusions and pinholes, occur under the surface layer of a cast slab, which results in linear flaws or scabs at the time of rolling. In particular, in ultra-low-carbon steel, which is used for automobile outer panels or the like which need strict surface quality controls, the heat retention properties of the mold powder is important for reducing inclusions and bubbles under the surface layer of the cast slab.

In order to improve the heat retention properties of the mold powder, it is effective to add a metal powder to the mold powder to provide an exothermic mold powder which generates heat through utilization of an exothermic oxidation reaction of the metal powder. As the metal powder to be added to the exothermic mold powder, metal silicon powders and silicon alloy powders are generally used in view of the relationship between reactivity and heat amount.

In addition, while the form of the mold powder can be roughly classified into powder form and granular form, granular mold powder is often used in order to suppress generation of dust and improve the operational environment. Herein, when powdery mold powder and granular mold powder are compared in terms of heat retention properties for molten steel, granular mold powder has lower heat retention properties. Therefore, in order to improve the quality of steel, granular mold powder has greater need for addition of the metal powder than does powdery mold powder.

Further, as a method of producing the granular mold powder, various methods have been employed. An example thereof is a production method involving spray-drying a slurry to form the slurry into granules. Granular mold powder produced by the method is called sprayed granules. However, mold powder in the form of sprayed granules has the following problems: at the time of granulation, there is a need to add water to form the slurry, and hence hydrogen is generated through a reaction of water with the metal powder, which results in a risk of explosion; the metal powder is oxidized and its heat generation amount is reduced; and bubbles enter piping, and the slurry cannot be pumped. Therefore, in general, metal powder is not added to the mold powder in the form of sprayed granules.

With regard to a related-art method of adding metal powder to the granular mold powder, for example, in Patent Document 1, there is disclosed: an exothermic granular mold powder for continuous steel casting, characterized in that, in a mold powder for continuous casting including a heat generating agent formed of a metal or an alloy, a capsule obtained by coating a surface of the heat generating agent with a water-insoluble coating agent or a coating agent in which inorganic particles each having a particle diameter of 100 μm or less are dispersed in the water-insoluble coating agent is mixed with a base raw material, a silica raw material, a flux, a flame suppressing material, and a carbonaceous material, and the mixture is formed into granules (claim 1); and an exothermic granular mold powder for continuous steel casting, characterized by including a capsule in which part or the whole of one kind or two or more kinds of heat generating agents selected from an alkali metal carbonate, an alkali metal hydrogen carbonate, and an alkali metal nitrate, which are each reactive with the metal or the alloy in the capsule, is coated with the coating agent together with the heat generating agent (claim 2). However, the exothermic granular mold powder for continuous steel casting disclosed in Patent Document 1 has a problem in that the production of the capsule requires considerable cost and time.

In addition, in Patent Document 2, there is disclosed an exothermic granular mold powder for continuous steel casting, characterized in that, in a mold powder for continuous steel casting including a heat generating agent formed of a metal or an alloy, a binder in which an organic resin is dissolved in an organic solvent is used, and the heat generating agent is mixed with, for example, a base raw material, a silica raw material, a flux raw material, and/or a carbonaceous raw material, and the mixture is granulated into granules. However, the exothermic granular mold powder for continuous steel casting disclosed in Patent Document 2 requires treatment of the organic solvent and explosion prevention measures, and cannot be said to be advantageous in terms of cost.

Further, in Patent Document 3, there is disclosed a method of producing a granular mold powder for continuous casting, including adding water to a powder raw material in which a carbonate composition and/or a metal heat generating agent is blended, and granulating the resultant, followed by drying, characterized in that water is added to the powder raw material to form a slurry, and the slurry is subjected to spray granulation and drying to produce a hollow granular mold powder after the temperature of the slurry is maintained at 30° C. or less (claim 1). However, the method of producing a granular mold powder for continuous casting disclosed in Patent Document 3, allows a situation in which a metal reacts with water and is oxidized to some degree, and hydrogen is generated. Further, the method is not economic because considerable energy is required for cooling the slurry to a temperature of 30° C. or less. Besides, the method cannot be said to be a preferred method as a global warming countermeasure because dry ice is used for the cooling.

In order to solve the problems of the related art as described above, in Patent Document 4, there is disclosed: a method of producing an exothermic mold powder in the form of sprayed granules, characterized by granulating, by a spray granulation method, a slurry of a raw material blend containing: 0.1 mass % to 8 mass % of a metal silicon powder or a silicon alloy powder having a particle diameter falling within a range of from 45 μm to 105 μm; and 1.0 mass % or less of a metal powder having a particle diameter of less than 45 μm (claim 1); and a method of producing an exothermic mold powder in the form of sprayed granules, characterized by granulating, by a spray granulation method, a slurry of a raw material blend containing 0.1 mass % to 8 mass % of a metal powder in which a metal is coated with 0.01 mass % to 5 mass % of one or more kinds selected from the group consisting of a silicone oil, liquid paraffin, and ethylene glycol in advance (claim 3).

PRIOR ART DOCUMENTS

Patent Documents

[Patent Document 1] JP H06-23502 A
[Patent Document 2] JP H06-63713 A
[Patent Document 3] JP 3215970 B2
[Patent Document 4] JP 5857777 B2

SUMMARY OF THE INVENTION

Problem to be Solved by the Invention

There is a demand for an exothermic mold powder in the form of sprayed granules having a higher heat generation amount than the exothermic mold powder in the form of sprayed granules obtained by the method disclosed in Patent Document 4. Therefore, a further increase in the amount of the metal powder is required. However, in Patent Document 4, it is disclosed that the case in which the amount of the metal powder exceeds 8 mass % is not preferred because the amount of hydrogen to be generated is sometimes increased. The current state cannot respond to the case in which the metal powder is added in an amount exceeding 8 mass %.

In view of the foregoing, an object of the present invention is to provide a method of producing an exothermic mold powder in the form of sprayed granules, which, in granulating a granular mold powder from an aqueous slurry containing a metal powder, can solve problems in that the metal powder reacts with water to make the granulation impossible and causes a reduction in function without the need for a new raw material or a new step, and can respond to the case in which the metal powder is included in an amount exceeding 8 mass %.

Means for Solving the Problem

In order to achieve the above-mentioned object, the inventors of the present invention have made extensive investigations into the cause of the generation of a hydrogen gas in a slurry for spray drying containing metal silicon and a method of suppressing the generation of the hydrogen gas.

A reaction between metal silicon and an alkaline solution is known to be represented by the following formula (3):

$$Si + 2OH^- + H_2O = SiO_3^{2-} + 2H_2\uparrow \quad (3)$$

In addition, the reaction proceeds no further, simultaneously with the generation of the hydrogen gas, $SiO_2$ is generated by a reaction between metal silicon and water, and a $SiO_2$ reaction layer (reaction film) is formed on surfaces of metal silicon particles. Meanwhile, when the formed $SiO_2$ reaction layer is removed for some reason, the reaction continues, to generate large amounts of the hydrogen gas.

When a normal mold powder is made into an aqueous slurry, the aqueous slurry becomes a strong alkali having a pH of around 13. This is considered to be largely due to the effect of Portland cement, lithium carbonate, sodium carbonate, or potassium carbonate added to the mold powder.

The inventors of the present invention felt that it was possible that the stability of the $SiO_2$ reaction layer could change depending on the pH of the slurry for spray drying, and performed a model experiment. Specifically, aqueous solutions having different pH's were prepared through use of sodium hydroxide, 10 g of a metal silicon powder was suspended in 100 ml of each of the aqueous solutions, and the amount of hydrogen gas generated was measured by a water displacement method. The temperature was set to room temperature (25° C.), and the measurement time period was set to 1 hour. The results are shown in FIG. 1. In FIG. 1, the pH of the aqueous solution is plotted on the abscissa, and the amount of the hydrogen gas generated is plotted on the ordinate. As a result, it was revealed that the amount of the hydrogen gas generated changed depending on the pH of the aqueous solution, and the amount of hydrogen generated increased at extreme levels at a pH of more than 13. From the result, it is considered that when, in spray-drying the slurry containing the metal silicon powder to granulate the slurry into granules, the pH of the slurry is suppressed to 13 or less, the generation of the hydrogen gas can be significantly suppressed.

Meanwhile, the inventors of the present invention have made investigations into what conditions cause the pH of a slurry for sprayed granules to become higher than 13. In some cases, Portland cement and an alkali metal carbonate, such as sodium carbonate, are used in a raw material blend for the slurry for sprayed granules. A change in pH of the slurry in such case was examined.

When water is added to Portland cement, the resultant solution has a pH of 12.5. The high pH is attributed to the dissociation equilibrium of $Ca(OH)_2$.

$$Ca(OH)_2 = Ca^{2+} + 2OH^- \quad (4)$$

Meanwhile, an aqueous solution of sodium carbonate ($Na_2CO_3$) has a pH of 11.7.

$$Na_2CO_3 = 2Na^+ + CO_3^{2-} \quad (5)$$

However, when Portland cement and sodium carbonate coexist, $Ca^{2+}$ and $CO_3^{2-}$ bind to each other to form $CaCO_3$. Thus, $Ca^{2+}$ is reduced and $OH^-$ is increased, and the pH is increased to more than 13.

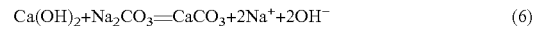

$$Ca(OH)_2 + Na_2CO_3 = CaCO_3 + 2Na^+ + 2OH^- \quad (6)$$

Therefore, it was found that, by reducing the blending ratios of Portland cement and the alkali metal carbonate, increases in pH of the slurry for sprayed granules can be suppressed. However, Portland cement and the alkali metal carbonate are raw materials advantageous in terms of cost constituting the exothermic mold powder in the form of sprayed granules. Therefore, the relationship between the blending ratio of Portland cement and the blending ratio of the alkali metal carbonate was examined. As a result, the inventors have found that the increase in pH of the slurry for sprayed granules can be effectively suppressed when the blending ratio of Portland cement and the blending ratio of the alkali metal carbonate are set to fall within predetermined ranges.

The inventors have completed the present invention on the basis of the above-mentioned finding.

That is, according to the present invention, there is provided a method of producing an exothermic mold powder in a form of sprayed granules comprising spray-drying into granules, an aqueous slurry containing a raw material blend and a metal silicon powder and/or a silicon alloy powder, characterized in that the pH of the aqueous slurry is adjusted to a range of 13 or less.

Effects of the Invention

According to the method of producing an exothermic mold powder in the form of sprayed granules of the present invention, in spray-drying into granules, aqueous slurry containing a metal powder, the amount of hydrogen gas to be generated through a reaction between the metal powder and water can be significantly reduced, and the reaction between the metal powder and water can be suppressed. Thus, the metal powder in the exothermic mold powder in the form of sprayed granules to be obtained can sufficiently exhibit its action and effect as a metal for heat generation.

BRIEF DESCRIPTION OF DRAWINGS

FIG. 1 is a graph for showing a relationship between the pH of an aqueous solution and the amount of hydrogen gas generated.

FIG. 2 is a graph for showing a relationship between the pH of an aqueous slurry and the amount of hydrogen gas generated in Examples and Comparative Examples.

FIG. 3 is a graph for showing a blending ratio of Portland cement, a blending ratio of an alkali metal carbonate, and a degree of generation of a hydrogen gas in Examples and Comparative Examples.

BEST MODE FOR CARRYING OUT THE INVENTION

A method of producing an exothermic mold powder in the form of sprayed granules of the present invention includes, in spray-drying into granules, an aqueous slurry containing a raw material blend including a base raw material, a silica raw material, a flux raw material and another component described below, and a metal silicon powder and/or a silicon alloy powder; adjusting the pH of the aqueous slurry to 13 or less.

The raw material blend to be used in the method of producing an exothermic mold powder in the form of sprayed granules of the present invention may be formed of a base raw material formed of CaO and $SiO_2$, a silica raw material, a flux raw material, another component, and the like.

Herein, as the base raw material, for example, synthetic calcium silicate, wollastonite, phosphorus slag, blast furnace slag, dicalcium silicate, calcium carbonate, or Portland cement may be used. The blending ratio of the base raw material falls within a range of from 40 mass % to 90 mass %, preferably from 50 mass % to 80 mass %. Cases in which the blending ratio of the base raw material is less than 40 mass % are not preferred because the addition amounts of other raw materials are relatively increased, and the exothermic mold powder in the form of sprayed granules cannot play its original roles, such as a lubrication action and an inclusion absorption action. In addition, cases in which the blending ratio of the base raw material exceeds 90 mass % are not preferred because the addition amounts of the other raw materials are relatively reduced, and melting characteristics required for the exothermic mold powder in the form of sprayed granules cannot be ensured. In the method of producing an exothermic mold powder in the form of sprayed granules of the present invention, Portland cement can be utilized as a base raw material which contains silica and calcia and is advantageous in terms of cost. In addition, when Portland cement is used as the base raw material, it is required that the blending ratio of Portland cement satisfy the expression (1) described below.

Next, the silica raw material is used in order to adjust a basicity (mass ratio of Ca/Si in terms of an oxide:mass ratio of $CaO/SiO_2$) of the exothermic mold powder in the form of sprayed granules. For example, perlite, fly ash, silica sand, feldspar, silica rock powder, diatomite, glass powder, silica flour, and the like may be used. Herein, the blending ratio of the silica raw material falls within a range of 30 mass % or less (including 0 mass %), preferably 20 mass % or less (including 0 mass %). Cases in which the blending ratio of the silica raw material exceeds 30 mass % are not preferred because the mass ratio of $CaO/SiO_2$ is excessively reduced, and the viscosity of the exothermic mold powder in the form of sprayed granules is increased, with the result that the lubrication between a mold and a cast slab cannot be ensured.

Further, the flux raw material is used in order to adjust the melting characteristics of the exothermic mold powder in the form of sprayed granules. Sodium fluoride, lithium fluoride, magnesium fluoride, cryolite, fluorite, boric acid, borax, colemanite, alumina, and the like may be used. Herein, the blending ratio of the flux raw material in terms of a total amount falls within a range of from 3 mass % to 45 mass %, preferably from 8 mass % to 40 mass %. Cases in which the blending ratio of the flux raw material in terms of a total amount is less than 3 mass % are not preferred because the melting point and solidification temperature of the exothermic mold powder in the form of sprayed granules are excessively increased. In addition, cases in which the blending ratio of the flux raw material in terms of a total amount exceeds 45 mass % are not preferred because a change in composition occurs at the time of melting owing to vaporization, and an immersion nozzle configured to inject molten steel into a mold is drastically eroded.

In addition, as another raw material for forming the raw material blend, for example, an oxidant, a carbon raw material, or a magnesia raw material may be utilized.

Herein, as the oxidant, for example, an alkali metal hydrogen carbonate, an alkali metal nitrate, manganese oxide, manganese carbonate, iron oxide, or an alkali metal carbonate may be used. Herein, the blending ratio of the oxidant in terms of a total amount falls within a range of from 1 mass % to 30 mass %, preferably from 5 mass % to 20 mass %. Cases in which the blending ratio of the oxidant in terms of a total amount is less than 1 mass % are not preferred because the oxidation of the metal silicon powder and/or the silicon alloy powder serving as a metal for heat generation becomes insufficient, and the metal for heat generation remains in the exothermic mold powder in the form of sprayed granules as it is, which results in melt defects. In addition, cases in which the blending ratio of the oxidant exceeds 30 mass % are not preferred because a heat generation amount is excessively increased, and for example, it becomes difficult to see the inside of the mold owing to high flame generation, which results in a poor operation property. When the alkali metal carbonate, such as sodium carbonate, potassium carbonate, or lithium carbonate, is used as the oxidant, it is required that the blending ratio of the alkali metal carbonate satisfy the expression (1) described below.

As described above, the alkali metal carbonate acts as the oxidant for the metal silicon powder and the silicon alloy powder. However, the alkali metal carbonate increases the pH of the slurry, and hence it is preferred that the addition amount of the alkali metal carbonate be small, and it is more preferred that the alkali metal carbonate not be added. Therefore, it is effective to use, as an alternative oxidant to the alkali metal carbonate, sodium nitrate, potassium nitrate, sodium hydrogen carbonate, and potassium hydrogen carbonate, which are each less liable to increase the pH. The blending amount of the alkali metal carbonate and the alkali metal nitrate in terms of a total amount is 11 mass % or less, preferably 8 mass % or less.

In addition, the carbon raw material may be added as required in order to adjust the melting speed of the exothermic mold powder in the form of sprayed granules. As the carbon raw material, for example, coke, graphite, carbon black, and the like may be used. Herein, the blending ratio of the carbon raw material is preferably 10 mass % or less (including 0 mass %). The case in which the blending ratio of the carbon raw material exceeds 10 mass % is not preferred because the melting of the mold powder slows down excessively.

In addition, the magnesia raw material and the like may be blended as the other raw material.

In the method of producing an exothermic mold powder in the form of sprayed granules of the present invention, the metal silicon powder and/or the silicon alloy powder is used as a metal for heat generation in view of the relationship between safety and heat amount. Herein, as the silicon alloy powder, a Ca—Si alloy powder, an Fe—Si alloy powder, and the like may be utilized.

The metal silicon powder and the silicon alloy powder each preferably have a particle size of 75 μm or less. Cases in which a metal silicon powder or a metal silicon alloy powder having a particle size of more than 75 μm are added is not preferred because an oxide layer is formed on a surface, exothermic oxidation is difficult to occur in an inside, and an exothermic mold powder in the form of sprayed granules having a heat generation amount commensurate with the addition amount of the metal powder is not obtained. A metal silicon powder or a silicon alloy powder having a smaller particle size proceeds with an exothermic oxidation reaction more easily, but at the same time, has a problem of being more liable to react with water and generate hydrogen gas at the time of production. However, in the method of producing an exothermic mold powder in the form of sprayed granules of the present invention, the problem of the generation of hydrogen gas is prevented even when the metal silicon powder and the silicon alloy powder each have a small particle size. The particle sizes of the metal silicon powder and the silicon alloy powder are measured according to JIS 8801-1 "Test sieves—Part 1: Test sieves of metal wire cloth."

In producing the exothermic mold powder in the form of sprayed granules, in order to suppress the generation of a hydrogen gas, it is also effective to reduce the addition amount of the metal silicon powder and the silicon alloy powder. However, cases in which the addition amount of the metal silicon powder and the silicon alloy powder are reduced is not preferred because the heat generation amount of the exothermic mold powder in the form of sprayed granules at the time of actual casting, which is the original purpose of the addition of the metal silicon powder and the silicon alloy powder, is reduced. In the method of producing an exothermic mold powder in the form of sprayed granules of the present invention, the addition amount of the metal silicon powder and/or the silicon alloy powder in terms of an external ratio to the raw material blend falls within a range of from 0.1 mass % to 20 mass %, preferably from 1 mass % to 13 mass %. Herein, even when the addition amount of the metal silicon powder and/or the silicon alloy powder in terms of an external ratio to the raw material blend exceeds 20 mass %, the generation of hydrogen gas from the aqueous slurry can be suppressed. However, cases in which the addition amount of the metal silicon powder and/or the silicon alloy powder in terms of an external ratio to the raw material blend exceeds 20 mass % are not preferred because the heat generation amount is excessively increased, and for example, it becomes difficult to see the inside of the mold owing to high flame generation, which results in a poor operation property. In addition, the case in which the addition amount of the metal silicon powder and/or the silicon alloy powder in terms of an external ratio to the raw material blend is less than 0.1 mass % are not preferred because the heat generation amount of the exothermic mold powder in the form of sprayed granules at the time of actual casting, which is the original purpose of the addition of the metal for heat generation, is excessively reduced. The method of producing an exothermic mold powder in the form of sprayed granules of the present invention is effective even in the case in which the addition amount of the metal silicon powder and/or the silicon alloy powder in terms of an external ratio to the raw material blend exceeds 8 mass %.

In the method of producing an exothermic mold powder in the form of sprayed granules of the present invention, in order to suppress the generation of a hydrogen gas from the aqueous slurry containing the raw material blend and the metal silicon powder and/or the silicon alloy powder as described above, the pH of the aqueous slurry is adjusted to 13 or less, preferably 12 or less. Cases in which the slurry has a pH of more than 13 are not preferred because the amount of a hydrogen gas to be generated from the aqueous slurry is remarkably increased. When the aqueous slurry has a pH of from 12 to 13, it is observed that a hydrogen gas is generated in a small amount, but the generation of the hydrogen gas poses no particular problem at the time of production of the exothermic mold powder in the form of sprayed granules by virtue of a slight generation amount. Further, when the aqueous slurry has a pH of less than 12, the generation of a hydrogen gas is hardly observed.

In the method of producing an exothermic mold powder in the form of sprayed granules of the present invention, as a method of adjusting the pH of the aqueous slurry to 13 or less, for example, the following method may be adopted: a method involving adopting the blending ratio of the raw material blend at which an increase in pH of the aqueous slurry does not occur.

Herein, as a method of blending the raw material blend so that the pH of the slurry is adjusted to 13 or less, there is given a method involving adjusting the blending ratio of Portland cement and the blending ratio of the alkali metal carbonate to the raw material blend so as to satisfy the following expression (1):

$$B \leq 65/(A+14)-0.9 \tag{1}$$

where A represents the blending ratio (mass %: the case in which A represents 0 is included) of Portland cement to the raw material blend, and B represents the blending ratio (mass %: the case in which B represents 0 is included) of the alkali metal carbonate to the raw material blend. However, the case in which A and B simultaneously represent 0 is excluded.

The case in which the blending ratio of Portland cement and the blending ratio of the alkali metal carbonate to the raw material blend satisfy the following expression (2) is more preferred.

$$B \leq 65(A+20)-1.1 \tag{2}$$

The expressions (1) and (2) are each obtained by formulating plots of FIG. 3 for showing a relationship between: the blending ratio of Portland cement and the blending ratio of an alkali metal carbonate; and the pH of an aqueous slurry obtained, that is, the amount of a hydrogen gas generated in each of Examples and Comparative Examples described below. Herein, in FIG. 3, the plot represented by the symbol "⊚" represents the case in which the aqueous slurry has a pH of less than 12, that is, the amount of a hydrogen gas generated is 15 ml or less, the plot represented by the symbol "○" represents the case in which the aqueous slurry has a pH of from 12 to 13, that is, the amount of a hydrogen gas generated is more than 15 ml and 50 ml or less, and the plot represented by the symbol "x" represents the case in which the aqueous slurry has a pH of more than 13, that is, the amount of a hydrogen gas generated is more than 50 ml. As shown in the expressions (1) and (2), the blending ratios of Portland cement and the alkali metal carbonate and the pH of the aqueous slurry obtained have such a relationship that the blending ratio of Portland cement and the blending ratio of the alkali metal carbonate are inversely proportional to each other. This is presumably because, when Portland cement and the alkali metal carbonate are used in combination, the pH of the aqueous slurry is increased, and the amount of hydrogen gas generated is increased along with this.

In addition, as another method, there may be adopted a method involving using a blend without the alkali metal carbonate and Portland cement to adjust the pH of the aqueous slurry to 13 or less. With this, while the increase in pH of the aqueous slurry is mainly caused by the above-mentioned formulae (4), (5), and (6), the reaction represented by the formula (6) is prevented from occurring when an aqueous slurry without the alkali metal carbonate and Portland cement is used, and thus the increase in pH can be suppressed, with the result that the pH of the aqueous slurry can be adjusted to 13 or less.

The method of producing an exothermic mold powder in the form of sprayed granules of the present invention can be performed by a spray granulation method involving using the aqueous slurry having a pH of 13 or less as described above. The spray granulation method involves adding an organic binder to the raw material blend and the metal silicon powder and/or the silicon alloy powder so that the aqueous slurry has a solid content concentration of from 50 mass % to 70 mass %, preferably from 55 mass % to 65 mass %, and spraying, to dryness, the aqueous slurry from a spray nozzle into a spray dryer into which hot air at from 450° C. to 850° C. is blown to granulate the aqueous slurry into granules.

As the organic binder, methyl cellulose, carboxymethyl cellulose, starch, xanthan gum, dextrin, or the like may be used. The addition amount of the organic binder falls within a range of 5 mass % or less, preferably 3 mass % or less.

Examples

The present invention is further described by way of Examples described below.

The blending ratios of raw materials for slurries to be used in the method of producing an exothermic mold powder in the form of sprayed granules of the present invention, and evaluation results, and the blending ratios of raw materials to be used in Comparative Examples, and evaluation results are shown in Tables 1 and 2. As the "Chemical composition (mass %)" in each of those tables, the composition of a powder slag obtained by heating the resultant exothermic mold powder in the form of sprayed granules at 1,300° C. is shown in terms of an oxide.

TABLE 1

| Raw material blend (mass %) | | | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|---|---|---|---|---|---|---|---|---|---|---|---|
| Base raw material | | Synthetic calcium silicate A | 85 | | | | | | | | | | | | | | | | |
| | | Synthetic calcium silicate B | | | | | | | | | | | | | | | | | |
| | | Wollastonite | | 20 | 31 | 19 | | 26 | 25 | 33 | | | 7 | 25 | 26 | 25 | 5 | 17 | 7 |
| | | Blast furnace slag | | 8 | 7 | 31 | 26 | | 28 | 11 | 26 | 39 | | | 24 | 10 | 37 | 7 | |
| | | Calcium carbonate | | 24 | 15 | 5 | 22 | 25 | | 5 | 22 | | | 50 | 28 | | | 20 | 30 | 50 |
| | | Portland cement | | | | | 10 | | | 5 | 15 | 20 | 50 | | | 5 | 10 | | | |
| | Silica raw material | Perlite | | 2 | | 4 | | 4 | | | | 1 | | 5 | | 4 | | 4 | | |
| | | Fly ash | | 2 | | | 3 | 5 | | 2 | 3 | | | | | | 2 | | | |
| | | Silica rock powder | | 5 | | | 6 | | | | 6 | 2 | 5 | | | | | 4 | 3 | 5 |
| | | Diatomite | | | | 3 | | | | | | | | | | | | | 8 | |
| | Flux raw material | Glass powder | | | 7 | | 6 | | 9 | 2 | | | | | 9 | 8 | 3 | | | |
| | | Sodium fluoride | | 7 | 8 | 6 | 5 | 3 | 8 | 5 | | 8 | | | 8 | 5 | 5 | | 6 | 3 |
| | | Lithium fluoride | | | | 4 | 2 | | 5 | 3 | 2 | | | 4 | | | 2 | 2 | | |
| | | Magnesium fluoride | 4 | | | 4 | | 10 | | 1 | | | 7 | 3 | | | 3 | | | 7 |
| | | Cryolite | | 6 | 8 | 8 | 1 | 3 | 4 | | 1 | 2 | | 7 | 4 | 3 | | | 9 | 7 |
| | | Fluorite | | 8 | 4 | | 6 | 4 | 1 | 12 | 6 | 15 | | 8 | 1 | 7 | 18 | | 4 | 8 |
| | | Alumina | 1 | 2 | | 1 | 2 | 2 | 2 | 2 | 2 | | | | 3 | | 2 | 3 | 1 | 1 |
| | Oxidant | Sodium carbonate | | | | | | | 1 | | | 1 | | | 2 | | 1 | | | |
| | | Potassium carbonate | | | | | 1 | | 2 | | 1 | | 1 | | | 1 | 2 | | | |
| | | Lithium carbonate | | | 4 | | | | 4 | | 3 | | | | 4 | | 6 | 2 | | |
| | | Sodium hydrogen carbonate | | 4 | | 5 | 3 | | 3 | 8 | 3 | 3 | | | | | | 3 | | |
| | | Potassium hydrogen carbonate | | 4 | 3 | | 3 | | | | | | | 4 | 3 | 3 | | | 2 | 4 |
| | | Sodium nitrate | 4 | | | | | 4 | | 3 | | 2 | | | | 2 | 4 | 5 | 3 | |
| | | Potassium nitrate | | | | | 2 | 2 | | | 3 | 7 | | | | | | | | |
| | Carbon | Iron oxide | 6 | 8 | 13 | 8 | 10 | 12 | 10 | 6 | 10 | | 8 | 10 | 10 | 8 | 4 | 10 | 8 |
| | | Coke | | | | | | | | | | | | | | | | | | |
| | | Graphite | | | | | | | | | | | | | | | | | | |
| | | Carbon black | | | | | | | | | | | | | | | | | | |
| Total | | | 100 | 100 | 100 | 100 | 100 | 100 | 100 | 100 | 100 | 100 | 100 | 100 | 100 | 100 | 100 | 100 | 100 |
| Amount of metal powder (external ratio; mass %) | | | 10 | 10 | 10 | 10 | 10 | 10 | 10 | 10 | 10 | 10 | 10 | 10 | 10 | 10 | 10 | 10 | 10 |
| Metal silicon powder | | | | | 15 | 5 | 10 | 25 | 3 | 5 | 15 | 20 | 50 | 5 | 5 | 10 | 20 | 30 | 50 |
| Amount of Portland cement (mass %) | | | 1 | 2 | | 1 | 1 | | | 2 | 1 | 1 | | | 3 | 3 | 2 | 1 | 1 |
| Amount of alkali metal carbonate (mass %) | | | 10 | 10 | 10 | 10 | 10 | 10 | 10 | 10 | 10 | 10 | 10 | 10 | 10 | 10 | 10 | 10 | 10 |
| Chemical composition (mass %) | $SiO_2$ | | 30 | 38 | 38 | 34 | 36 | 36 | 38 | 40 | 38 | 39 | 33 | 38 | 36 | 34 | 37 | 37 | 33 |
| | $Al_2O_3$ | | 4 | 3 | 4 | 5 | 7 | 5 | 1 | 4 | 7 | 2 | 4 | 1 | 5 | 4 | 5 | 6 | 4 |
| | $Fe_2O_3$ | | 7 | 8 | 13 | 8 | 10 | 12 | 10 | 6 | 11 | 7 | 9 | 11 | 9 | 8 | 5 | 10 | 8 |
| | CaO | | 31 | 30 | 30 | 27 | 32 | 27 | 29 | 31 | 34 | 34 | 33 | 29 | 27 | 30 | 36 | 28 | 34 |
| | MgO | | 3 | 1 | 1 | 3 | 2 | 7 | 4 | 2 | 2 | 1 | 5 | 3 | 2 | 1 | 3 | 2 | 5 |
| | $Na_2O + K_2O + Li_2O$ | | 14 | 11 | 8 | 13 | 7 | 5 | 11 | 9 | 4 | 8 | 6 | 12 | 12 | 12 | 9 | 9 | 6 |
| | F | | 11 | 9 | 6 | 10 | 6 | 8 | 7 | 8 | 4 | 9 | 10 | 6 | 9 | 11 | 5 | 8 | 10 |
| | F.C | | 0 | 0 | 0 | 0 | 0 | 0 | 0 | 0 | 0 | 0 | 0 | 0 | 0 | 0 | 0 | 0 | 0 |

TABLE 1-continued

| | | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|---|---|---|---|---|---|---|---|---|---|---|
| Results | pH | 11.5 | 11.8 | 10.6 | 11.1 | 10.8 | 11.3 | 12.1 | 12.3 | 12.8 | 12.9 | 12.3 | 13.3 | 13.2 | 13.4 | 13.2 | 13.1 | 13.1 |
| | Amount of hydrogen gas generated (ml) | 13 | 15 | 6 | 11 | 9 | 12 | 16 | 17 | 21 | 38 | 16 | 231 | 223 | 248 | 214 | 201 | 208 |
| | Total evaluation | ⊚ | ⊚ | ⊚ | ⊚ | ⊚ | ⊚ | ○ | ○ | ○ | ○ | ○ | X | X | X | X | X | X |

TABLE 2

| | | Ex. 12 | Ex. 13 | Ex. 14 | Ex. 15 | Ex. 16 | Ex. 17 | Ex. 18 | Ex. 19 | Ex. 20 | Ex. 21 | Ex. 22 | Ex. 23 | Ex. 24 | Ex. 25 | Ex. 26 | Ex. 27 | Ex. 28 | Ex. 29 | Ex. 30 | Comp. Ex. 7 | Comp. Ex. 8 |
|---|---|---|---|---|---|---|---|---|---|---|---|---|---|---|---|---|---|---|---|---|---|---|
| Raw material blend (mass %) | Base raw material: Synthetic calcium silicate A | 19 | 19 | 19 | 19 | 4 | 19 | 19 | | | | | | | | 32 | | | | | | 19 |
| | Synthetic calcium silicate B | | | | | | | | | | | | | 28 | 30 | | 32 | 37 | 38 | 28 | 10 | 19 |
| | Wollastonite | 27 | 28 | 35 | 38 | 53 | 31 | 31 | 26 | 37 | 32 | 37 | 38 | 28 | 30 | 24 | 8 | 8 | 18 | 28 | 25 | 24 |
| | Blast furnace slag | 5 | 5 | 5 | 5 | 5 | 5 | 5 | 17 | | 8 | 8 | 18 | | | | | 15 | | | 20 | 10 |
| | Calcium carbonate | 4 | 4 | 3 | | | 4 | 4 | 15 | 20 | 20 | 15 | 5 | 28 | | 5 | 20 | | 10 | | 6 | 4 |
| | Portland cement | | | | | | | | 5 | 2 | 8 | 2 | 5 | | 5 | 4 | 8 | 2 | 4 | | 7 | |
| Silica raw material | Perlite | | | | | | | | 6 | | | 2 | | | | 3 | | 2 | | | | |
| | Fly ash | 7 | 6 | | | | 3 | 3 | | 3 | 5 | 8 | 4 | | | | 5 | 8 | | | | 3 |
| | Silica rock powder | 6 | 6 | 6 | 6 | 6 | 7 | 7 | | 8 | 8 | | 5 | 16 | 9 | 8 | 8 | | 4 | 4 | 5 | 7 |
| | Diatomite | 4 | 4 | 4 | 4 | 4 | 6 | 6 | 3 | | 4 | | 4 | 8 | 8 | 5 | 4 | 7 | 5 | 16 | 5 | 6 |
| | Glass powder | 4 | 4 | 4 | 4 | 4 | 6 | 6 | | | 7 | 7 | 4 | 5 | 2 | | 7 | | 6 | 8 | 2 | 6 |
| Flux raw material | Sodium fluoride | 8 | 8 | 8 | 8 | 8 | 8 | 8 | 1 | 2 | 2 | 6 | 2 | 4 | 3 | 4 | 2 | 6 | 2 | 5 | 3 | 8 |
| | Lithium fluoride | | | | | | | | 6 | 15 | | 8 | | | 4 | 7 | | 8 | | 4 | | |
| | Magnesium fluoride | 2 | 2 | 2 | 2 | 2 | 2 | 2 | 2 | | 1 | | 5 | 4 | 1 | | | 1 | 5 | 1 | | 2 |
| | Cryolite | 1 | 1 | 1 | 1 | 1 | 1 | 1 | | 1 | | | 2 | 1 | 2 | 1 | 1 | 1 | 1 | 1 | | 1 |
| | Fluorite | | | | | | | | | | | 2 | | 2 | 1 | 1 | | | | 2 | | 2 |
| | Alumina | | | | | | | | 1 | | | | 1 | | | | 1 | | | | | |
| Oxidant | Sodium Carbonate | | | | | | 2 | | 4 | 3 | | | | 1 | | | | 1 | 1 | 1 | 2 | |
| | Potassium carbonate | | | | | | 1 | 1 | 4 | | | | | | | | | | | | 2 | 1 |
| | Lithium carbonate | | | | | | 5 | 3 | | | | | | | | | | | | | | 3 |
| | Sodium hydrogen carbonate | 5 | 5 | 5 | 5 | 5 | | | | | | | | | | | | | | | | |
| | Potassium hydrogen carbonate | | | | | | | | | | | | | | | 2 | | | | | | |
| | Sodium nitrate | | | | | | | | | 2 | | | | | | | | | | | 2 | |
| | Potassium nitrate | 8 | 8 | 8 | 8 | 8 | | | 10 | 7 | | | | | | | | | | | 4 | 1 |
| | Iron oxide | | | | | | | | | | | | | | | | | | | | | 1 |
| Carbon | Coke | | | | | | | 1 | 1 | | 1 | | 2 | 2 | 1 | 3 | 1 | 3 | 2 | 2 | 1 | 1 |
| | Graphite | | | | | | | 1 | | | 1 | 3 | | 3 | 2 | | | | 1 | 3 | 1 | 1 |
| | Carbon black | | | | | | | 2 | | | 3 | 2 | 3 | 1 | 2 | 1 | 3 | 2 | 1 | 2 | 3 | 2 |
| Total | | 100 | 100 | 100 | 100 | 100 | 100 | 100 | 100 | 100 | 100 | 100 | 100 | 100 | 100 | 100 | 100 | 100 | 100 | 100 | 100 | 100 |
| Amount of metal powder (external ratio; mass %) | Metal silicon powder | 6 | 8 | 13 | 15 | 20 | 10 | 10 | 5 | 5 | 1 | 1 | 2 | 2 | 3 | 3 | 3 | 1 | 1 | 1 | 3 | 4 |
| | Ca—Si alloy powder | | | | | | | | | | 5 | | | 2 | | | | | 1 | 2 | | |
| | Fe—Si alloy powder | | | | | | | | | 5 | | | | | | | | | | | 2 | |
| Amount of Portland cement (mass %) | | 5 | 5 | 5 | 5 | 5 | 5 | 5 | 15 | 20 | 20 | 2 | 5 | 3 | 3 | 5 | 20 | 2 | 10 | 10 | 20 | 10 |
| Amount of alkali metal carbonate (mass %) | | 1 | 1 | 1 | 1 | 1 | 1 | 1 | 1 | 1 | 1 | 1 | 2 | 3 | 3 | 2 | 1 | 2 | 1 | 1 | 2 | 3 |
| Amount of metal powder (mass %) | | 6 | 8 | 13 | 15 | 20 | 10 | 10 | 10 | 10 | 5 | 1 | 5 | 3 | 3 | 3 | 1 | 2 | 5 | 5 | 3 | 4 |
| CheChemical composition (mass %) | SiO₂ | 32 | 33 | 36 | 37 | 36 | 35 | 34 | 34 | 36 | 33 | 36 | 35 | 32 | 33 | 30 | 33 | 35 | 36 | 32 | 34 | 27 |
| | Al₂O₃ | 5 | 5 | 4 | 4 | 4 | 5 | 5 | 8 | 2 | 4 | 4 | 6 | 2 | 2 | 7 | 4 | 4 | 5 | 2 | 6 | 6 |
| | Fe₂O₃ | 9 | 9 | 8 | 8 | 8 | 0 | 0 | 12 | 7 | 1 | 0 | 0 | 0 | 0 | 0 | 1 | 0 | 0 | 0 | 6 | 0 |
| | CaO | 27 | 27 | 28 | 28 | 28 | 28 | 27 | 33 | 36 | 30 | 35 | 35 | 34 | 36 | 32 | 30 | 35 | 33 | 35 | 34 | 29 |
| | MgO | 3 | 3 | 3 | 3 | 4 | 5 | 4 | 2 | 1 | 6 | 1 | 4 | 5 | 3 | 2 | 6 | 1 | 4 | 5 | 3 | 5 |

TABLE 2-continued

| | | Ex. 12 | Ex. 13 | Ex. 14 | Ex. 15 | Ex. 16 | Ex. 17 | Ex. 18 | Ex. 19 | Ex. 20 | Ex. 21 | Ex. 22 | Ex. 23 | Ex. 24 | Ex. 25 | Ex. 26 | Ex. 27 | Ex. 28 | Ex. 29 | Ex. 30 | Comp. Ex. 7 | Comp. Ex. 8 |
|---|---|---|---|---|---|---|---|---|---|---|---|---|---|---|---|---|---|---|---|---|---|---|
| | $Na_2O + K_2O + Li_2O$ | 14 | 13 | 12 | 11 | 11 | 15 | 14 | 6 | 8 | 11 | 9 | 8 | 12 | 12 | 13 | 11 | 9 | 9 | 12 | 8 | 16 |
| | F | 10 | 10 | 9 | 9 | 9 | 12 | 12 | 5 | 10 | 10 | 10 | 7 | 9 | 9 | 12 | 10 | 11 | 8 | 9 | 5 | 13 |
| | F.C | 0 | 0 | 0 | 0 | 0 | 0 | 4 | 0 | 0 | 5 | 5 | 5 | 6 | 5 | 4 | 5 | 5 | 5 | 5 | 4 | 4 |
| Results | pH | 11.1 | 11.1 | 11.1 | 11.1 | 11.1 | 11.1 | 11.1 | 12 | 12.1 | 12.3 | 11.8 | 12.3 | 12.1 | 12.1 | 12.3 | 12.3 | 11.8 | 10.8 | 12.1 | 13.2 | 13.4 |
| | Amount of hydrogen gas generated (ml) | 5 | 8 | 14 | 16 | 22 | 11 | 12 | 19 | 21 | 3 | 2 | 4 | 4 | 8 | 16 | 5 | 7 | 17 | 28 | 73 | 93 |
| | Total evaluation | ◎ | ◎ | ◎ | ○ | ○ | ◎ | ◎ | ○ | ○ | ◎ | ◎ | ◎ | ◎ | ◎ | ○ | ◎ | ◎ | ○ | ○ | X | X |

TABLE 3

| | | | Ex. 31 | Exa. 32 |
|---|---|---|---|---|
| Raw material blend (mass %) | Base raw material | Synthetic calcium silicate A | 85 | |
| | | Synthetic calcium silicate B | | |
| | | Wollastonite | | 37 |
| | | Blast furnace slag | | 8 |
| | | Calcium carbonate | | 15 |
| | | Portland cement | | |
| | Silica raw material | Perlite | | 2 |
| | | Fly ash | | 2 |
| | | Silica rock powder | | 8 |
| | | Diatomite | | |
| | | Glass powder | | |
| | Flux raw material | Sodium fluoride | | |
| | | Lithium fluoride | | 7 |
| | | Magnesium fluoride | 4 | |
| | | Cryolite | | 6 |
| | | Fluorite | | 8 |
| | | Alumina | | |
| | Oxidant | Sodium carbonate | | |
| | | Potassium carbonate | | |
| | | Lithium carbonate | | |
| | | Sodium hydrogen carbonate | | |
| | | Potassium hydrogen carbonate | | |
| | | Sodium nitrate | 1 | 2 |
| | | Potassium nitrate | 4 | |
| | | Iron oxide | 6 | |
| | Carbon | Coke | | |
| | | Graphite | | 3 |
| | | Carbon black | | 2 |
| | Total | | 100 | 100 |
| Amount of metal powder (external ratio; mass %) | | Metal silicon powder | 10 | 1 |
| | | Ca—Si alloy powder | | |
| | | Fe—Si alloy powder | | |
| Amount of Portland cement (mass %) | | | | |
| Amount of alkali metal carbonate (mass %) | | | | |
| Amount of metal powder (mass %) | | | 10 | 1 |
| Chemical composition (mass %) | | $SiO_2$ | 30 | 36 |
| | | $Al_2O_3$ | 4 | 4 |
| | | $Fe_2O_3$ | 7 | 0 |
| | | CaO | 31 | 35 |
| | | MgO | 3 | 1 |
| | | $Na_2O + K_2O + Li_2O$ | 14 | 9 |
| | | F | 11 | 10 |
| | | F.C | 0 | 5 |
| Results | pH | | 10.5 | 10.8 |
| | Amount of hydrogen gas generated (ml) | | 6 | 1 |
| | Total evaluation | | ⊚ | ⊚ |

In the tables:

the synthetic calcium silicate A has a content of $SiO_2$ of 16 mass %, a content of CaO of 43 mass %, a content of $Al_2O_3$ of 6 mass %, a content of MgO of 1 mass %, a content of $Na_2O$ of 17 mass %, and a content of F of 13 mass %;

the synthetic calcium silicate B has a content of $SiO_2$ of 40 mass %, a content of CaO of 55 mass %, a content of $Al_2O_3$ of 2 mass %, and a content of F of 13 mass %;

the metal silicon powder has a particle diameter of 45 μm or less;

the Ca—Si alloy powder has a content of Ca of 35 mass %, a content of Si of 65 mass %, and a particle diameter of 75 μm or less; and the Fe—Si alloy powder has a content of Fe of 20 mass %, a content of Si of 80 mass %, and a particle diameter of 75 μm or less.

In each of Examples and Comparative Examples, the amount of a hydrogen gas generated from an aqueous slurry was evaluated as described below.

An aqueous slurry was prepared by mixing 100 g of a mixture of: a raw material blend having blending ratios shown in Tables 1 and 2; and a metal silicon powder (a Ca—Si alloy powder, or an Fe—Si alloy powder) with 400 ml of water, and the amount (ml) of a hydrogen gas generated was measured by a water displacement method. The measurement temperature was set to room temperature (25° C.), and the measurement time period was set to 1 hour. In addition, the pH (25° C.) of the aqueous slurry was also measured.

In the "Total evaluation" in each of the tables, the symbol "⊚" represents the case in which the amount of a hydrogen gas generated is 15 ml or less, the symbol "○" represents the case in which the amount of a hydrogen gas generated is more than 15 ml and 50 ml or less, and the symbol "x" represents the case in which the amount of a hydrogen gas generated is more than 50 ml.

In each of the Examples, the amount of hydrogen generated was 50 ml or less, which was at a level which did not cause a problem. However, in each of Comparative Examples 1 to 7, the amount of hydrogen generated was 70 ml or more, and hydrogen was generated in a large amount. This is presumably because the pH of the slurry was increased to 13 or more.

In addition, a relationship between the pH of the aqueous slurry obtained in each of the Examples and Comparative Examples and the amount of a hydrogen gas generated therefrom is shown in FIG. 2. In addition, the blending ratio of Portland cement, the blending ratio of the alkali metal carbonate, and the degree of generation of a hydrogen gas in each of Examples and Comparative Examples are shown in FIG. 3. In FIG. 3, the plot represented by the symbol "⊚" represents the case in which the aqueous slurry has a pH of less than 12, that is, the amount of a hydrogen gas generated is 15 ml or less, the plot represented by the symbol "○" represents the case in which the aqueous slurry has a pH of from 12 to 13, that is, the amount of a hydrogen gas generated is more than 15 ml and 50 ml or less, and the plot represented by the symbol "x" represents the case in which the aqueous slurry has a pH of more than 13, that is, the amount of a hydrogen gas generated is more than 50 ml.

When the exothermic mold powder in the form of sprayed granules is actually produced, the amount of the aqueous slurry is increased. Therefore, a production test was performed using an actual apparatus. Through use of a 3,000-liter slurry production tank, an aqueous slurry was prepared by mixing 500 kg of a total amount of a raw material blend and a silicon powder with 330 liters of water, and 7 kg of carboxymethyl cellulose serving as an organic binder. For the production test, the blending ratios of each of Examples 3, 5, and 11 were used, and the slurry was spray-dried with a spray dryer using hot air at 650° C. Thus, an exothermic mold powder in the form of sprayed granules was obtained. The pH's (25° C.) of the slurries using the blending ratios of Examples 3, 5, and 11 were 10.6, 10.8, and 12.3, respectively, which were the same as the measurement results shown in Table 1. The amount of a hydrogen gas generated from each of the slurries was small, and the exothermic mold powder in the form of sprayed granules was able to be produced with no problem. In addition, the pH's (25° C.) of slurries of Examples 31 and 32, in which an alkali metal carbonate and Portland cement were not included, were 10.5 and 10.8, respectively. The amount of a hydrogen gas generated from each of the slurries was small, and an exothermic mold powder in the form of sprayed granules was able to be produced with no problem.

Meanwhile, in the case of a slurry using the blending ratios of Comparative Example 4, the amount of a hydrogen gas generated was large and there was a danger, and hence there was no choice but to stop production on the way.

The invention claimed is:

1. A method of producing an exothermic mold powder in a form of sprayed granules, the method consisting of spray-drying into granules, an aqueous slurry containing a raw material blend and a metal silicon powder and/or a silicon alloy powder, wherein a pH of the aqueous slurry is adjusted to a range of 13 or less by setting blending ratios of a Portland cement and an alkali metal carbonate to the raw material blend so as to satisfy the following expression (1):

$$B \leq 65/(A+14)-0.9 \quad (1)$$

wherein A represents the blending ratio of Portland cement in mass %, and A may include 0, and B represents the blending ratio of the alkali metal carbonate in mass %, and B may include 0, provided that A and B are not simultaneously 0.

2. The method of producing an exothermic mold powder in a form of sprayed granules according to claim 1, wherein a blending ratio of the metal silicon powder and/or the silicon alloy powder to the raw material blend in terms of an external ratio falls within a range of from 0.1 mass % to 20 mass %.

3. The method of producing an exothermic mold powder in a form of sprayed granules according to claim 1, wherein the raw material blend comprises a base raw material, a silica raw material, a flux raw material, and another component.

4. The method of producing an exothermic mold powder in a form of sprayed granules according to claim 3, wherein the base raw material comprises the Portland cement, or the Portland cement and one or more selected from the group consisting of synthetic calcium silicate, wollastonite, phosphorus slag, blast furnace slag, dicalcium silicate, and calcium carbonate.

5. The method of producing an exothermic mold powder in a form of sprayed granules according to claim 3, wherein the another component comprises one or more selected from the group consisting of an oxidant, a carbon raw material, and a magnesia raw material.

6. The method of producing an exothermic mold powder in a form of sprayed granules according to claim 5, wherein the oxidant comprises the alkali metal carbonate, or the alkali metal carbonate and one or more selected from the group consisting of an alkali metal hydrogen carbonate, an alkali metal nitrate, manganese oxide, manganese carbonate, and iron oxide.

7. The method of producing an exothermic mold powder in a form of sprayed granules according to claim 6, wherein the oxidant comprises the one or more selected from the group consisting of an alkali metal hydrogen carbonate, an alkali metal nitrate, manganese oxide, manganese carbonate, and iron oxide.

8. The method of producing an exothermic mold powder in a form of sprayed granules according to claim 3, wherein the base raw material comprises one or more selected from the group consisting of synthetic calcium silicate, wollastonite, phosphorus slag, blast furnace slag, dicalcium silicate, and calcium carbonate.

* * * * *